May 31, 1955     J. B. MELVILLE     2,709,619
CARTON HOLDER AND HANDLE

Filed July 2, 1953

JOHN B. MELVILLE
INVENTOR.

BY *Lyon & Lyon*

ATTORNEYS

United States Patent Office 2,709,619
Patented May 31, 1955

2,709,619

CARTON HOLDER AND HANDLE

John B. Melville, Torrance, Calif.

Application July 2, 1953, Serial No. 365,708

3 Claims. (Cl. 294—87.28)

The present invention relates to improved holders for cartons, such as milk cartons, for purposes of facilitating carrying and handling of a plurality of the same as a unit, and constitutes an improvement on the device shown and claimed in my copending United States patent application Serial No. 260,676, filed December 8, 1951.

Milk is often sold in cardboard paraffin impregnated rectangular cartons in one-quart and two-quart sizes; thus requiring cartons of two sizes, although it is understood that some dairies prefer to sell their milk in two-quart cartons.

An important object of the present invention is to provide improved means for handling and carrying a plurality of containers as a unit.

Another object of the present invention is to provide an improved combination handle and gripping element which may be easily applied to a plurality of cartons, which is inexpensive so that the same may be considered as an expendable item.

Another object of the present invention is to provide an improved combination handling and gripping element which may be easily applied to a plurality of cartons to effect the intended purpose and which remains in tight gripping relationship to the cartons so that there is less likelihood of accidental detachment of cartons when carrying and handling the same as a unit.

Another object of the present invention is to provide an improved combination handle and carton gripping element which is inherently resilient, which may be readily applied and which is relatively inexpensive.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

The combination handle and gripping element is of some inexpensive and inherently resilient or elastic material, such as organic plastic, wire or metal, and comprises in general a downwardly extending, centrally located supporting post 10 which is provided with an enlarged triangular portion 10A at its lowest extremity, having its apex pointing downwardly for purposes of providing a pair of hooking elements or article supporting seats, namely, a pair of outwardly extending hooking elements or seats 10B, 10C which are adapted to engage the insides of the rectangular or square flange, lip, or edge of a pair of cartons 12, 12.

The post 10 is provided also with a pair of abutments 10E, 10F which are spaced immediately above and have exposed planar surfaces which are parallel respectively with the planar exposed surfaces of the seats 10B and 10C. The spaced elements 10B, 10E, on the one hand, define a generally rectangular opening 10H; and similarly the spaced elements 10C, 10F define a generally rectangular opening 10J, these two openings being on opposite sides of the centrally disposed wall 10K which joins the triangular portion 10A to the upper portion of the post.

Also this combination handle and gripping element includes a pair of resilient arms 10M, 10N which are supported as cantilevers on the upper end of the post 10, the outer or free ends of each of such arms 10M, 10N being provided with downwardly extending triangular portions 10P, 10R, respectively, such triangular portions 10P, 10R are at the extremities of the cantilever supported arm, each of such arms being provided with an integrally formed abutment 10S, 10T. The abutment 10S is spaced from the seat or hook 10P to provide a generally rectangular opening 10W. Similarly, the abutment 10T is spaced from the seat 10R to provide a generally rectangular opening 10V.

Figure 2:
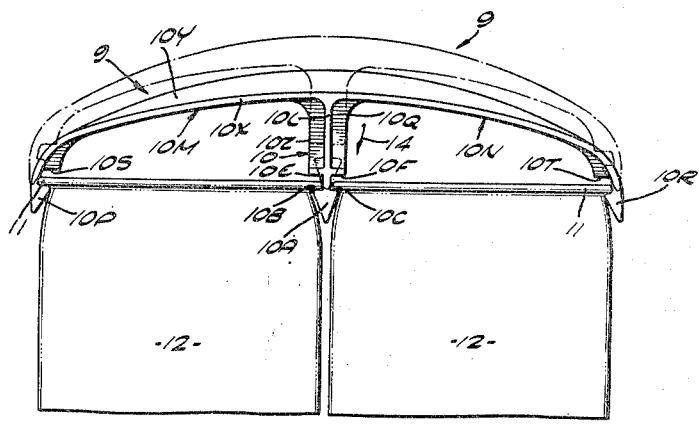
Figure 2 is a view in side elevation of the combination handle and gripping element illustrated in Figure 1, such element being shown in its operative position in full lines and is also illustrated in phantom lines for purposes of indicating the manner in which the element is applied to the pair of cartons.

This combination handle and gripping element designated generally by the reference numeral 9, as indicated in Figure 2, is applied by moving such element 10, as shown in phantom lines, to its position as shown in full lines. During such movement, the outer end of the resilient or deformable arms 10M, 10N, are initially deflected outwardly, i. e., cammed outwardly, during the time the flange 11 of the milk carton engages the triangular portions 10P, 10R; continued downward movement results in registry of the seats 10P, 10R with the flange 11 and thereupon the arms 10M, 10N move inwardly with a snapping movement to resiliently engage the flange 11.

Simultaneously with such seating of the flange 11 in the openings 10W, 10V, the central triangular hooks or seats 10B, 10C are being disposed, or are already disposed, below the flange 11. This operation may be accomplished simply by a person pressing the post 10 downwardly by applying a force thereon in the direction indicated by the arrow 14, with, of course, the cartons 12 resting on a flat supporting surface such as a table top.

During the positioning of such element 9 as described above, the abutments 10S, 10T, 10E and 10F limit downward movement of the handle 9 and assure accurate placement of the carton flanges 11 in the openings 10W, 10V, 10H and 10J.

Figure 1:
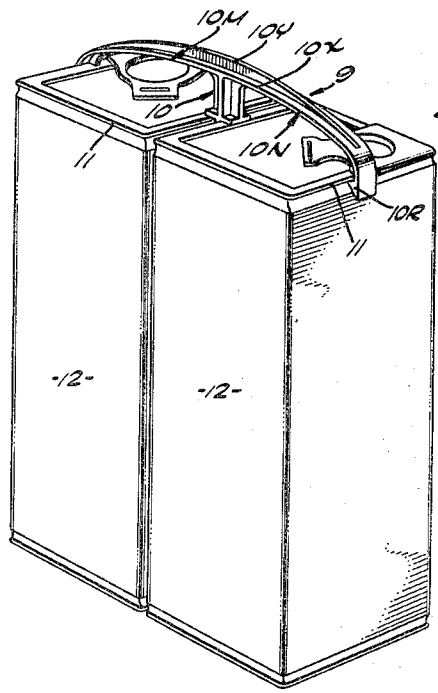
Figure 1 is a perspective view showing a combination carton and gripping element embodying features of the present invention in operative relationship to a pair of paraffin impregnated paper cartons.
Figure 4:
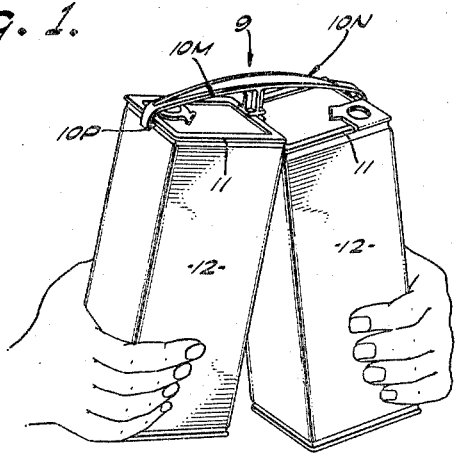
Figure 4 illustrates the manner in which the two-quart size cartons may be detached from the combination handle and gripping element.
Figure 3:
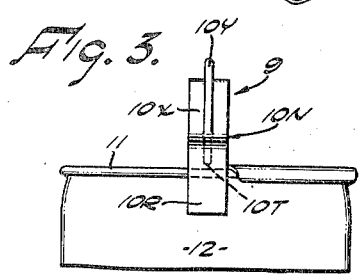
Figure 3 is an end view of the combination handle and gripping element in operative relationship to the carton.

Once the handle and gripping element 9 is thus positioned, the two cartons 12 may be carried and handled as a unit. For purposes of convenience, in dispensing the milk from the cartons, each of which is a standard one-quart carton, the combination handle and gripping element 9 may be detached from at least one of the cartons by a person gripping different cartons 12 with different hands at the lower ends of such cartons, as illustrated in Figure 4 and moving such lower ends of the cartons apart from each other. This operation may be accomplished very quickly and without much effort since, in such case, the cartons themselves serve as cantilevers through which manual forces thus applied are multiplied.

Besides the abutments 10S, 10T, 10E and 10F serving as stop members in the application of the handle 9, as described above, such abutments serve a useful function also when and as the cartons are subsequently carried as a unit by the handle 9, in which case such abutments serve to maintain the carton flanges 11 precisely within the openings 10W, 10V, 10H and 10J.

Figure 5:
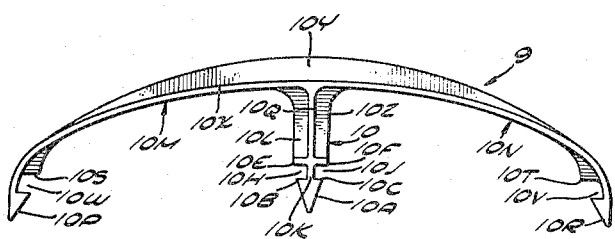
Figure 5 is a view in side elevation of the combination handle and gripping element.

In order to impart the desired resiliency to the arms 10M and 10N, while yet providing a sufficiently strong handle, the arms 10M and 10N are formed as shown in the drawings by an arcuate generally triangular cross-sectioned plastic strip 10X which extends generally from one of the seats 10P all the way over to the other seat 10R and such strip 10X has integrally formed therewith a vertically extending rib 10Y which is also generally rectangularly cross-sectioned but, as shown in Figure 5, such rib 10Y is tapered, having substantially no taper at regions adjacent to the abutments 10S and 10T and having a maximum cross section at the center of the handle. The post 10 is rigid and has substantially no flexibility, and to provide the desired strength the upper portion 10Z of the post 10 comprises generally rectangular cross-sectioned strips 10Q and 10L which have their planes extending generally perpendicular to each other.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A carrier for a pair of flat-sided containers having flanges on at least two opposite sides of the upper end thereof, comprising: a central post provided adjacent its lower end with a pair of notch-like openings in opposed relationship on opposite sides thereof, said openings receiving adjacent portions of the flanges of a pair of said containers positioned in side-by-side relationship; and a pair of resilient clamping arms integrally joined at their inner ends with the upper end of said central post and extending outwardly in opposite directions, the free end of each of said arms being provided with an inwardly directed portion to underlie a portion of the flanges of said containers opposite said portion of said flanges received by said openings with said central post having sufficient length above said openings to raise the inner ends of said clamping arms above the upper ends of said containers to provide space for the insertion of fingers for lifting purposes but with the length of said central post above said openings being less than the distance between the central post at said openings and the portion of the free ends of said clamping arms engaging said flanges.

2. A carrier for a pair of flat-sided containers having flanges on at least two opposite sides of the upper end thereof, comprising: a central post provided adjacent its lower end with a pair of notch-like openings in opposed relationship on opposite sides thereof, said openings receiving adjacent portions of the flanges of a pair of said containers positioned in side-by-side relationship, the lower end of said central post being provided below said notch-like opennigs with a pair of converging cam surfaces; and a pair of resilient clamping arms integrally joined at their inner ends with the upper end of said central post and extending outwardly in opposite directions, the free end of each of said arms being provided with an inwardly directed notch-like opening to receive a portion of the flanges of said containers opposite said portion of said flanges received by said openings of said central post, the free end of each of said arms being provided below said notch-like opening therein with a downwardly and outwardly extending cam surface, the cam surface of each of said clamping arms forming, with the opposed cam surface of said central post, a pair of diverging cam surfaces permitting attachment of the carrier to a pair of side-by-side containers by downward movement of said carrier with respect to said containers, said central post having sufficient length above said openings therein to raise the inner ends of said clamping arms above the upper ends of said containers to provide space for the insertion of fingers for lifting purposes but with the length of said central post above said openings therein being less than the distance between the central post at said openings and the portion of the free ends of said clamping arms at the openings in said arms.

3. The carrier of claim 1 in which said clamping arms extend continuously outwardly and downwardly from their inner ends to the portion of said arms containing said notch-like openings.

References Cited in the file of this patent

UNITED STATES PATENTS

| | | |
|---|---|---|
| 1,749,796 | Ahlin et al. | Mar. 11, 1930 |
| 1,776,680 | Doyle | Sept. 23, 1930 |
| 1,854,379 | Oakden | Apr. 19, 1932 |
| 2,078,848 | Griger | Apr. 27, 1937 |
| 2,349,531 | Weir | May 23, 1944 |
| 2,509,113 | Sweet | May 23, 1950 |
| 2,510,641 | Koscher | June 6, 1950 |